Oct. 10, 1950   F. V. SUICK   2,525,733
FISH BAIT
Filed March 19, 1947
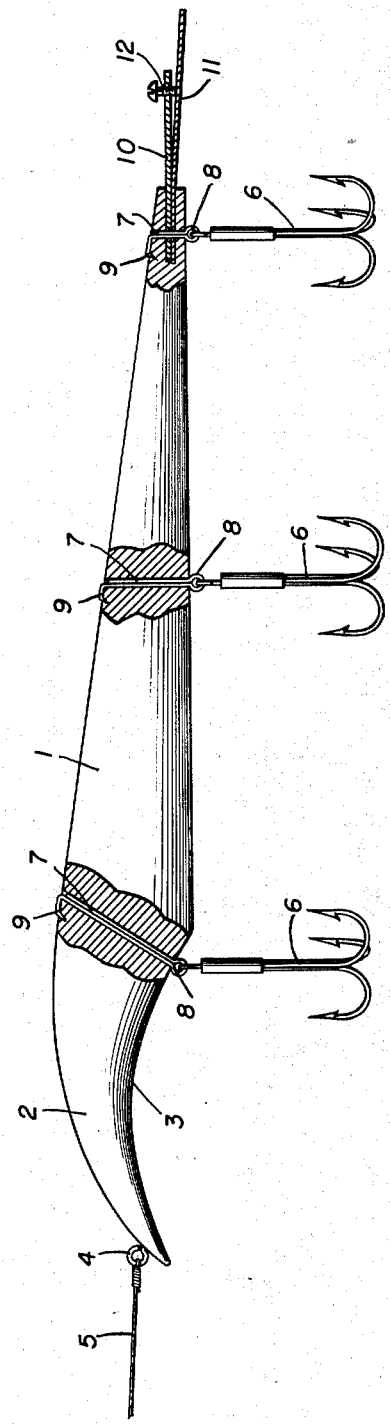
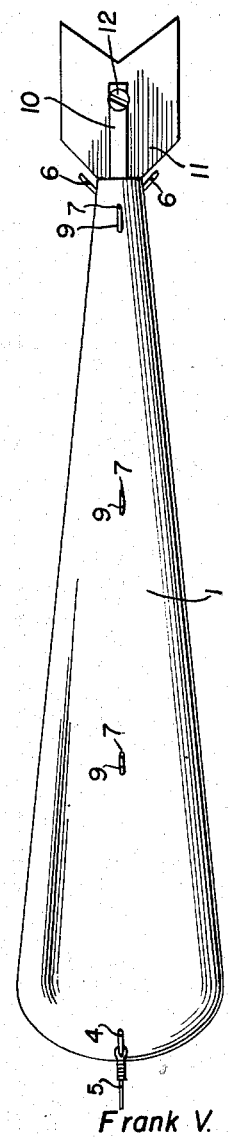
Inventor
Frank V. Suick
By Clarence A. O'Brien
and Harvey B. Jacobson
Attorneys Patented Oct. 10, 1950

2,525,733

UNITED STATES PATENT OFFICE 2,525,733

FISH BAIT

Frank V. Suick, Antigo, Wis.

Application March 19, 1947, Serial No. 735,768

1 Claim. (Cl. 43—42.22)

This invention relates to improvements in fish baits.

An object of the invention is to provide an improved form of fish bait having a head formed with an arcuate recess in its lower surface and a tail, and a plurality of multiple barbed hooks supported by said bait in spaced relation between said head and tail.

Another object of the invention is to provide an improved form of fish bait comprising an elongated body being substantially wider than its thickness, and formed with an arcuate undercut recess at the head end thereof and with an adjustable tail at the rear end, together with a series of multiple barbed hooks supported by double legged pins extending through the body of said bait and one leg of each pin being substantially longer than the other leg to bend over the upper surface of the bait and to be driven into the body thereof for locking the pin in fixed position.

A further object of the invention is to provide an improved fish bait including an elongated body having a head and a tail with multiple barbed hooks supported below said bait body between the head and the tail, together with a rearwardly extending strap and flexible tail supported at the rear end of said bait, and an adjusting screw for varying the angular inclination of said tail to control the movement of said bait when drawn through the water.

A still further object of the invention is to provide an improved fish bait which will be highly efficient in operation, and relatively inexpensive to manufacture and produce.

Other objects will appear as the description proceeds.

In the accompanying drawings which form a part of this application,

Figure 1 is a side elevation of the improved fish bait being partly broken away and in section to show the hook supporting pins extending through said bait, and Figure 2 is a plan view of the bait.

Like characters of reference are used throughout the following specification and the accompanying drawings to designate corresponding parts.

In carrying out the invention, there is provided an improved fish bait comprising an elongated body generally denoted by the reference numeral 1, the same being substantially wider than the thickness of the bait, and tapering from the forward end to the rear end thereof.

The head end or forward end of the bait 2 is formed with an undercut recess 3 from the forwardmost portion of the bait to extend a considerable distance towards the rear, and an eye 4 is supported at the forwardmost end of the bait for attaching a fish line 5 thereto for pulling the bait through the water.

A plurality of multiple barbed hooks 6 will be supported upon the double leg pins 7 formed with the eyes 8 in their lower ends and adapted to extend through the body of the bait with the longer leg 9 being bent over the upper surface of the bait and bent inwardly to impinge and lock within the body of the bait, thereby holding the hooks securely in position to depend below the bait body and in spaced relation with each other.

A rearwardly extending strap 10 is supported within a slot in the rear end of the bait 1, and a widened flat tail 11 is also disposed in said slot immediately below the strap 10, while a screw 12 is threaded through said strap to engage the upper surface of said tail 11 to selectively vary the angular inclination of the same so as to control the weaving and diving movement of said bait as it is drawn through the water.

The construction of the tail is such that when properly adjusted the tail will be bent downwardly so that the bait when cast and strikes the water, will remain in the water with the front end thereof extending to a point at approximately the surface of the water with the back end of the bait depending therebelow at about a 45 degree angle.

In operation, the bait is worked by jerking upon the pole and fish line to which it is attached, and the bait will be caused to dive when it is jerked. When pressure is let off of the line, the bait rises at any angle of approximately 45 degrees until it reaches the surface of the water.

It will be understood that the fish bait may be made from wood or from plastic or from some light metallic substance, and may be painted any desired color for attracting fish.

From the foregoing description, it will be understood that the arcuate lower surface or recess in the head of the bait 1 is so constructed to cause the bait to nosedive when it is pulled upon, simulating the action of a minnow or other live object, thus quickly attracting fish of various types which will readily take the bait.

From the foregoing description, it will be seen that there has been devised and provided a highly efficient form of fish bait which will be relatively inexpensive to manufacture and produce.

While the preferred embodiment of the instant invention has been illustrated and described, it will be understood that it is not intended to limit the scope of the invention thereto, as many minor changes in the detail of construction may be resorted to without departure from the spirit of the invention.

Having thus described my invention what I claim as new and desire to secure by Letters Patent of the United States is:

A fish bait comprising an elongated body tapering from the front end to the rear end, the front end of said bait being formed with an arcuate recess in its lower surface, a line supporting eye at the front end of said bait, an adjustable tail at the rear end of said bait, multiple barbed hooks secured to the bottom of said bait and disposed in spaced relation between the rear end of said recess and said tail and pins having spaced parallel legs formed with integral eyes in their lower ends extending through said bait for supporting the hooks in said eyes, one leg of each pin being longer than the other leg to overlie the adjacent surface of said bait and to be driven inwardly into the bait to lock the same in fixed position, said adjustable tail comprising a strap extending rearwardly from the rear end of said bait, a flat tail supported in the rear end of the bait immediately below said strap, and an adjustable screw extending through said strap for engaging the upper surface of said tail for varying the angular inclination thereof to control the action of said bait.

FRANK V. SUICK.

REFERENCES CITED

The following references are of record in the file of this patent:

UNITED STATES PATENTS

| Number | Name | Date |
|---|---|---|
| 299,133 | Halkyard | May 27, 1884 |
| 522,352 | Poppowitsch | July 3, 1894 |
| 781,794 | Smith | Feb. 7, 1905 |
| 1,299,432 | Dickens | Apr. 8, 1919 |
| 1,525,291 | Green | Feb. 3, 1925 |
| 1,540,702 | Morriss | June 2, 1925 |
| 1,606,176 | Paulson | Nov. 9, 1926 |
| 1,627,512 | Hughes | May 3, 1927 |
| 2,216,929 | Zander | Oct. 8, 1940 |